US008639665B2

(12) United States Patent
Berman et al.

(10) Patent No.: US 8,639,665 B2
(45) Date of Patent: Jan. 28, 2014

(54) HYBRID BACKUP AND RESTORE OF VERY LARGE FILE SYSTEM USING METADATA IMAGE BACKUP AND TRADITIONAL BACKUP

(75) Inventors: Steven M. Berman, Pittsburgh, PA (US); Neeta Garimella, San Jose, CA (US); Wayne A. Sawdon, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/439,535

(22) Filed: Apr. 4, 2012

(65) Prior Publication Data

US 2013/0268493 A1  Oct. 10, 2013

(51) Int. Cl.
*G06F 17/30* (2006.01)
(52) U.S. Cl.
USPC .......................................................... 707/651
(58) Field of Classification Search
USPC .................. 707/604, 644, 649, 650, 651, 679
See application file for complete search history.

(56) References Cited

U.S. PATENT DOCUMENTS

| | | | |
|---|---|---|---|
| 6,154,852 A | 11/2000 | Amundson et al. | |
| 6,505,216 B1 | 1/2003 | Schutzman et al. | |
| 6,804,719 B1 * | 10/2004 | Cabrera et al. | 709/226 |
| 6,981,005 B1 | 12/2005 | Cabrera et al. | |
| 7,072,914 B2 * | 7/2006 | Cabrera et al. | 707/822 |
| 7,073,036 B2 | 7/2006 | Furuya et al. | |
| 7,103,740 B1 | 9/2006 | Colgrove et al. | |
| 7,165,059 B1 * | 1/2007 | Shah et al. | 1/1 |
| 7,197,520 B1 * | 3/2007 | Matthews et al. | 1/1 |
| 7,234,077 B2 | 6/2007 | Curran et al. | |
| 7,340,492 B2 * | 3/2008 | Cabrera et al. | 1/1 |
| 7,398,365 B1 | 7/2008 | Hardman | |
| 7,620,843 B2 | 11/2009 | Zohar et al. | |
| 7,634,491 B2 * | 12/2009 | Cabrera et al. | 1/1 |
| 7,680,830 B1 * | 3/2010 | Ohr et al. | 707/999.2 |

(Continued)

FOREIGN PATENT DOCUMENTS

CA   2384020 A1   11/2003
EP   0869439 A1   10/1998

(Continued)

OTHER PUBLICATIONS

U.S. Appl. No. 12/643,635.

(Continued)

*Primary Examiner* — Cam-Linh Nguyen
(74) *Attorney, Agent, or Firm* — Stephen R. Tkacs; Stephen J. Walder, Jr.; Randall J. Bluestone (57) ABSTRACT

A mechanism performs a metadata image backup of a hierarchical storage management (HSM) file system. Concurrent with performing the metadata image backup of the HSM file system, the mechanism identifies a set of resident files that are not yet stored off-line in the HSM file system. The mechanism identifies immutable files within the set of resident files to form an optimized set of resident files and passes the optimized set of resident files to a traditional backup system. The traditional backup system backs up file data for the set of resident files. Responsive to detecting an inability to restore a migrated managed state of a file, the mechanism unsets an immutable bit of the file attribute, restores file data for the file using the traditional backup system, and sets the immutable bit attribute of the file.

20 Claims, 4 Drawing Sheets

(56) References Cited

U.S. PATENT DOCUMENTS

| | | | |
|---|---|---|---|
| 7,788,234 | B2 | 8/2010 | DePue et al. |
| 8,055,622 | B1* | 11/2011 | Botes et al. ............... 707/640 |
| 8,126,847 | B1 | 2/2012 | Zheng et al. |
| 8,190,836 | B1* | 5/2012 | Zheng et al. ............... 711/162 |
| 8,200,638 | B1* | 6/2012 | Zheng et al. ............... 707/679 |
| 8,229,897 | B2* | 7/2012 | Cannon et al. ............... 707/679 |
| 8,280,853 | B1* | 10/2012 | Lai et al. ............... 707/651 |
| 8,392,370 | B1* | 3/2013 | Whitney et al. ............... 707/640 |
| 2003/0177149 | A1 | 9/2003 | Coombs |
| 2004/0267787 | A1 | 12/2004 | Huras et al. |
| 2004/0267822 | A1 | 12/2004 | Curran et al. |
| 2007/0294320 | A1 | 12/2007 | Yueh et al. |
| 2008/0010284 | A1 | 1/2008 | Beck |
| 2008/0177801 | A1 | 7/2008 | Garimella et al. |
| 2009/0043978 | A1 | 2/2009 | Sawdon et al. |
| 2009/0300079 | A1* | 12/2009 | Shitomi ............... 707/204 |
| 2010/0211547 | A1 | 8/2010 | Kamei et al. |
| 2010/0287142 | A1 | 11/2010 | Wesener et al. |
| 2011/0145196 | A1* | 6/2011 | Bender et al. ............... 707/640 |
| 2011/0153561 | A1 | 6/2011 | Sawdon et al. |
| 2011/0282841 | A1* | 11/2011 | Saika et al. ............... 707/649 |
| 2012/0150799 | A1* | 6/2012 | Matsuzawa ............... 707/622 |

FOREIGN PATENT DOCUMENTS

| | | |
|---|---|---|
| WO | WO 2007002397 A2 | 1/2007 |
| WO | WO 2007103289 A2 | 9/2007 |
| WO | WO 2011082138 A1 | 7/2011 |

OTHER PUBLICATIONS

Feng, Dan et al., "High Performance Virtual Backup and Archive System", INSPEC/Springer-Verlag; vol. 3993, 2006, 5 pages.

Forman, George et al., "Scaling Up Text Classification for Large File Systems", ACM International Conference on Knowledge Discovery & Data Mining (KDD'08), Aug. 24-27, 2008, 8 pages.

Green, Russell J. et al., "Designing a Fast, On-line Backup System for a Log-structured File System", INSPEC/DT Journal, vol. 8, No. 2, 1996, pp. 32-45.

IBM Corporation, "Importance Based Backups", www.ip.com, IPCOM000133755D; Feb. 7, 2006, 2 pages.

Kaczmarski, M. et al., "Beyond backup toward storage management", IBM Corporation, IBM Systems Journal, vol. 42, No. 2, 2003, pp. 322-337.

Wang, Andy et al., "The Conquest File System: Better Performance Through a Disk/Persistent-RAM Hybrid Design", ACM Transactions on Storage, vol. 2, No. 3, Aug. 2006, pp. 309-348.

Combined Search and Examination Report under Sections 17 and 18(3) dated Sep. 18, 2013 Application No. GB1302917.8, 7 pages.

* cited by examiner

HYBRID BACKUP AND RESTORE OF VERY LARGE FILE SYSTEM USING METADATA IMAGE BACKUP AND TRADITIONAL BACKUP

BACKGROUND

The present application relates generally to an improved data processing apparatus and method and more specifically to mechanisms for hybrid backup and restore of a very large file system using metadata image backup and traditional backup.

A file system is a software component that manages a defined set of storage devices and provides access to data in ways to facilitate consistent addition, modification, and deletion of data and data files. The term is also used to describe the set of data and metadata contained within a specific set of storage devices. A file is a named string of bits that can be accessed by a computer application. A file has certain standard attributes, such as length, modification time, and time of last access. Metadata is data providing information about one or more aspects of data, such as time and date of creation, creator, or author, storage location, and the like.

The advent of storage area network (SAN) file systems and low cost storage have created the possibility of very large file systems with a very large number of files. Unfortunately, the time required to completely restore file systems from a backup copy is proportional to the file system size. The customer has the choice of manually restoring files of particular interest first and allowing access to the file system with only an incomplete set of data restored, or delaying access until all data have been restored, The first option requires the administrator to precisely identify the data to be accessed, because applications that access unrestored data would fail. The second option involves the delay of resumption of business until all of the files have been restored.

SUMMARY

In one illustrative embodiment, a method, in a data processing system, is provided for hybrid metadata image backup and traditional backup, The method comprises performing a metadata image backup of a hierarchical storage management (HSM) controlled file system, The metadata image backup backs up file system metadata to create a point-in-time image of the structure of the HSM controlled file system. The method further comprises, concurrent with performing the metadata image backup of the HSM file system, identifying a set of resident files that are not stored off-line in the HSM file system yet. The method further comprises identifying immutable files within the set of resident files to form an optimized set of resident files and passing the optimized set of resident files to a traditional backup system, wherein the traditional backup system backs up file data for only the set of resident files.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and memory coupled to the one or more processors, The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

A metadata image backup is a means of capturing the organizational information about a file system such as is stored in metadata in a consistent single image that can be utilized to restore the entire namespace of the file system including directory names and file names. The metadata image backup can contain object names, access control lists, extended attributes, owner, group, and mode information about every file system object. The metadata image backup does not contain the data associated with each object. Rather, it is expected that the HSM system will store most or all of the data for the file system's objects and can be used to recall it after the image of the metadata has been restored first.

The illustrative embodiments provide a mechanism for utilizing a hybrid of metadata image backup and traditional backup for files. The mechanism may efficiently back up the complete collection of files in a large and busy file system to guard against data loss. Use of a change audit log to determine a list of incomplete files and/or images backed up permits the mechanism to take special measures for those files in the file system that did not quality for simple metadata image backup. A special case for restore of immutable files exists to allow data to be restored via a traditional backup/archive restore process.

Figure 1:
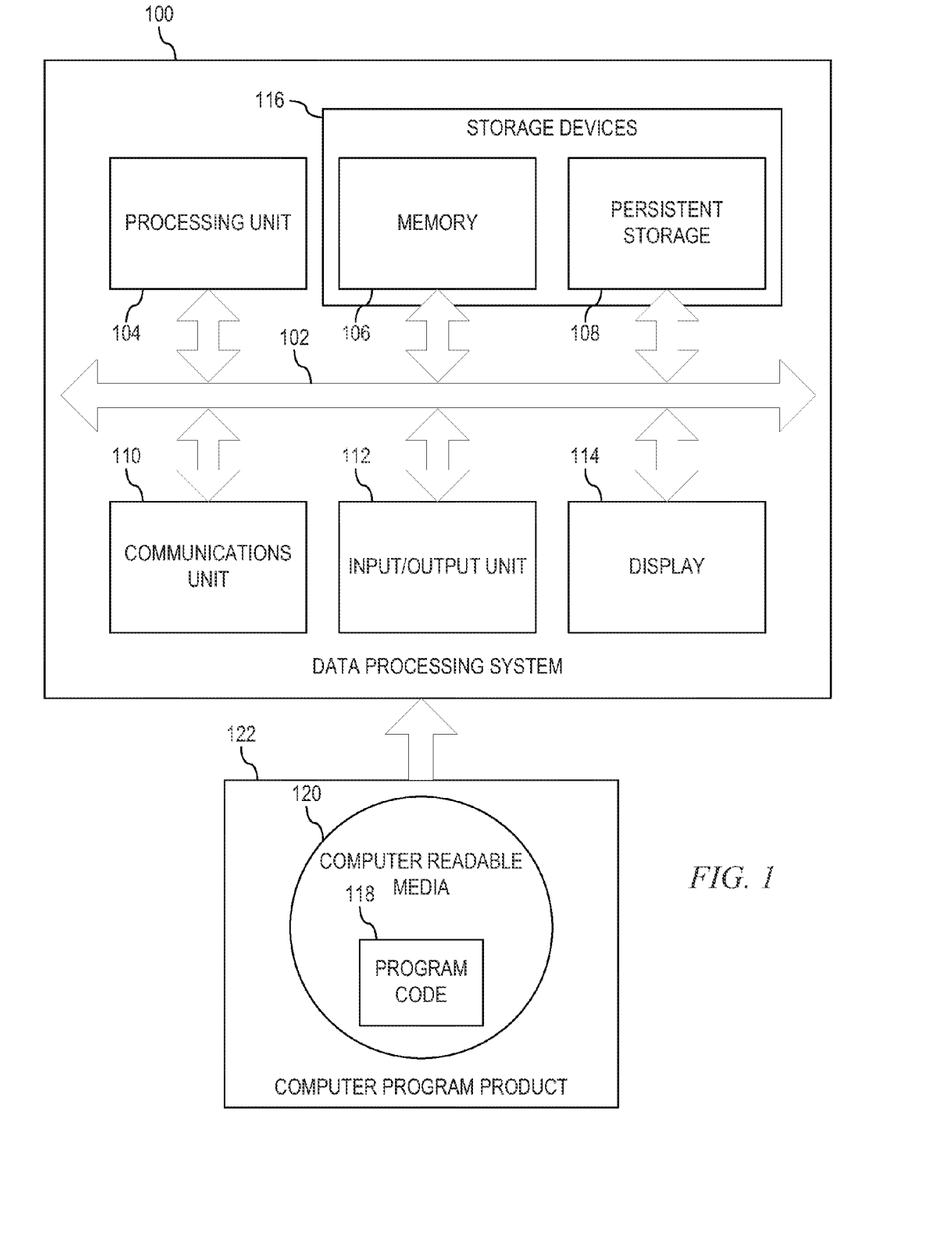
FIG. 1 depicts a block diagram of a data processing system in which illustrative embodiments may be implemented.

The illustrative embodiments may be utilized in many different types of data processing environments. In order to provide a context for the description of the specific elements and functionality of the illustrative embodiments, FIG. 1 is provided hereafter as an example environment in which aspects of the illustrative embodiments may be implemented. It should be appreciated that FIG. 1 is only an example and is not intended to assert or imply any limitation with regard to the environments in which aspects or embodiments of the present invention may be implemented. Many modifications to the depicted environments may be made without departing from the spirit and scope of the present invention.

FIG. 1 depicts a block diagram of a data processing system in which illustrative embodiments may be implemented. Data processing system 100 is an example of a computer, in which computer usable program code or instructions implementing the processes may be located for the illustrative embodiments. In this illustrative example, data processing system 100 includes communications fabric 102, which provides communications between processor unit 104, memory 106, persistent storage 108, communications unit 110, input/output (I/O) unit 112, and display 114.

Processor unit 104 serves to execute instructions for software that may be loaded into memory 106. Processor unit 104 may be a set of one or more processors or may be a multiprocessor core, depending on the particular implementation, Further, processor unit 104 may be implemented using one or more heterogeneous processor systems in which a main processor is present with secondary processors on a single chip. As another illustrative example, processor unit 104 may be a symmetric multi-processor system containing multiple processors of the same type.

Memory 106 and persistent storage 108 are examples of storage devices 116, A storage device is any piece of hardware that is capable of storing information, such as, for example, without limitation, data, program code in functional form, and/or other suitable information either on a temporary basis and/or a permanent basis. Memory 106, in these examples, may be, tor example, a random access memory or any other suitable volatile or non-volatile storage device. Persistent storage 108 may take various forms depending on the particular implementation. For example, persistent storage 108 may contain one or more components or devices. For example, persistent storage 108 may be a hard drive, a flash memory, a rewritable optical disk, a rewritable magnetic tape, or some combination of the above. The media used by persistent storage 108 also may be removable. For example, a removable hard drive may be used for persistent storage 108.

Communications unit 110, in these examples, provides for communications with other data processing systems or devices. In these examples, communications unit 110 is a network interface card. Communications unit 110 may provide communications through the use of either or both physical and wireless communications links.

Input/output unit 112 allows for input and output of data with other devices that may be connected to data processing system 100. For example, input/output unit 112 may provide a connection for user input through a keyboard, a mouse, and/or some other suitable input device. Further, input/output unit 112 may send output to a printer. Display 114 provides a mechanism to display information to a user.

Instructions for the operating system, applications and/or programs may be located in storage devices 116, which are in communication with processor unit 104 through communications fabric 102. In these illustrative examples the instruction are in a functional form on persistent storage 108. These instructions may be loaded into memory 106 for execution by processor unit 104. The processes of the different embodiments may be performed by processor unit 104 using computer implemented instructions, which may be located in a memory, such as memory 106.

These instructions are referred to as program code, computer usable program code, or computer readable program code that may be read and executed by a processor in processor unit 104. The program code in the different embodiments may be embodied on different physical or tangible computer readable media, such as memory 106 or persistent storage 108.

Program code 118 is located in a functional form on computer readable media 120 that is selectively removable and may be loaded onto or transferred to data processing system 100 for execution by processor unit 104. Program code 118 and computer readable media 120 form computer program product 1122 in these examples. In one example, computer readable media 120 may be in a tangible form, such as, for example, an optical or magnetic disc that is inserted or placed into a drive or other device that is part of persistent storage 108 for transfer onto a storage device, such as a hard drive that is part of persistent storage 108, In a tangible form, computer readable media 120 also may take the form of a persistent storage, such as a hard drive, a thumb drive, or a flash memory that is connected to data processing system 100. The tangible form of computer readable media 120 is also referred to as computer recordable storage media. In some instances, computer readable media 120 may not be removable.

Alternatively, program code 118 may be transferred to data processing system 100 from computer readable media 120 through a communications link to communications unit 110 and/or through a connection to input/output unit 112. The communications link and/or the connection may be physical or wireless in the illustrative examples. The computer readable media also may take the form of non-tangible media, such as communications links or wireless transmissions containing the program code.

In some illustrative embodiments, program code 118 may be downloaded over a network to persistent storage 108 from another device or data processing system for use within data processing system 100. For instance, program code stored in a computer readable storage medium in a server data processing system may be downloaded over a network from the server to data processing system 100. The data processing system providing program code 118 may be a server computer, a client computer, or some other device capable of storing and transmitting program code 118.

The different components illustrated for data processing system 100 are not meant to provide architectural limitations to the manner in which different embodiments may be implemented. The different illustrative embodiments may be implemented in a data processing system including components in addition to or in place of those illustrated for data processing system 100. Other components shown in FIG. 1 can be varied from the illustrative examples shown. The different embodiments may be implemented using any hardware device or system capable of executing program code. As one example, the data processing system may include organic components integrated with inorganic components and/or may be comprised entirely of organic components excluding a human being. For example, a storage device may be comprised of an organic semiconductor.

As another example, a storage device in data processing system 100 is any hardware apparatus that may store data. Memory 106, persistent storage 108 and computer readable media 120 are examples of storage devices in a tangible form.

In another example, a bus system may be used to implement communications fabric 102 and may be comprised of one or more buses, such as a system bus or an input/output bus. Of course, the bus system may be implemented using any suitable type of architecture that provides for a transfer of data between different components or devices attached to the bus system, Additionally, a communications unit may include one or more devices used to transmit and receive data, such as a modem or a network adapter. Further, a memory may be, for example, memory 106 or a cache such as found in an interface and memory controller hub that may be present in communications fabric 102.

Storage 108 may be a hierarchical storage management controlled file system. Hierarchical storage management (HSM) is a data storage technique that automatically moves data between high-cost and low-cost storage media. HSM systems exist because high-speed storage devices, such as hard disk drive arrays and. solid state drives, are more expensive per byte stored) than slower devices, such as optical discs and magnetic tape drives. While it would be ideal to have all data available on high-speed devices all the time, this is prohibitively expensive for many organizations. Instead, HSM systems store the bulk of the enterprise's data on slower devices, and then automatically copy data to faster disk drives, or even solid state drives, when needed. In effect, HSM turns the fast disk drives into caches for the slower mass storage devices, The HSM system monitors the way data is used and makes best guesses as to which data can safely be moved to slower devices and which data should stay on the fast devices.

In a typical HSM scenario, data files that are frequently used are stored on disk drives or solid state drives, but are eventually migrated to tape if they are not used for a certain period of time, typically a few months. Files in the fastest tier are referred to as "resident" files. If a user does access a file that is only on tape, the file is automatically moved back to the fastest tier, or resident storage. The advantage is that the total amount of stored data can be much larger than the capacity of the disk storage available, but because only rarely-used files are on tape, most users will usually not notice any slowdown. HSM systems can also utilize available bandwidth to pre-migrate data to tape. When data is pre-migrated, copies of the data exist in both the fastest tier storage and also on tape. The advantage of pre-migration is that it takes advantage of available storage network bandwidth to copy data to the slower tier such as tape in advance of any urgent need to make more available space. This improves the security of the data against possible loss and reduces the time needed to hilly migrate unchanged, resident files.

Figure 2:
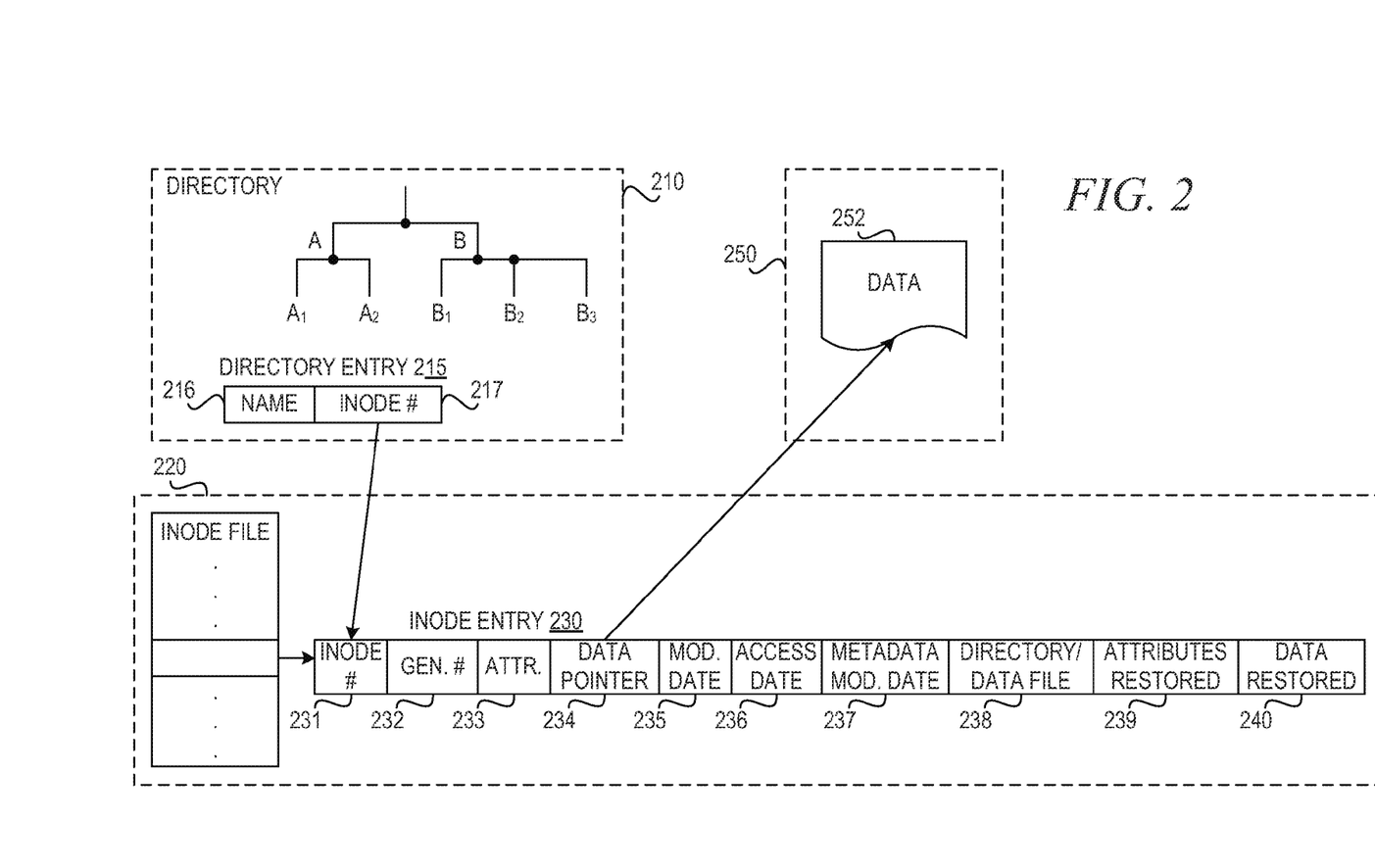
FIG. 2 illustrates principle elements in a file system in accordance with an illustrative embodiment.

FIG. 2 illustrates principle elements in a file system in accordance with an illustrative embodiment. A typical file system, such as the one shown, includes directory tree 210, Mode file 220, and data file 250 containing data block 252. A "directory" is a control structure that associates a name with a set of data represented by an Mode. An "irtode" is a data structure that contains the attributes of the file plus a series of pointers to areas of disk or other storage media, which contain the data that make up the file. Indirect blocks may supplement the mode with additional pointers, such as for very large files.

The directory tree, inode file, and data are typically present in a file system as files themselves. For example as shown in FIG. 2, inode file 220 comprises a collection of individual records or entries 230. In the depicted example, there is only one inode file per file system; however, cases where the file system comprises multiple inode files may be contemplated. Entries in directory tree 210 include a name field 216 and an inode number 217.

Special entries may be employed to denote a file as being a directory. A directory is a special file in which the names of the stored files are maintained in an arbitrarily deep directory tree. A directory tree is a collection of directories, which includes all of the directories in the file system. A directory is a specific type of file that is an element in the directory tree. A directory is a collection of pointers to nodes, which are either files or directories that occupy a lower position in the directory tree. A directory entry is a single record in a directory that points to a data file or directory.

In FIG. 2, an exemplary directory tree contains elements of the form 215, as shown. While FIG. 2 illustrates hierarchy with only two levels (for purposes of convenience), it should be understood the depth of the hierarchical tree structure of a directory is not limited to two levels. In fact, there may be dozens or even hundreds of levels present in a directory tree for very large file systems. The depth of the directory tree does, nevertheless, contribute to the necessity of multiple, sequential directory references when only one file is needed to be identified or accessed, However, in all cases the "leaves" of the directory tree are employed to associate a file name 216 with entry 230 in inode file 220. The reference is by "inode number" 217, which provides a pointer or index into inode file 220.

Directory tree 210 provides a hierarchical name space for the file system in that it enables reference to individual file entries by file name and a path through the tree, as opposed to reference by inode number. Each entry in a directory points to an inode. That inode may itself be another directory or a data file. Inode entry 230 is referenced by the entry in field 217. Inode file entry 230 in inode file 220 may be implemented as a linear list. Each entry in the list may include a plurality of fields: inode number 231, generation number 232, individual file attributes 233, data pointer 234, date of last modification 235, date of last access 236, date of last metadata modification 237, indicator field to indicate whether the inode represents a directory or data file 238, an indicator of whether attributes are restored 239, and an indicator of whether data are restored 240.

Data pointer 234 points to data block 250 containing data 252. In a hierarchical storage managed (HSM) file system, data file 252 may be resident in the fastest tier, such as solid state storage or hard disk drive storage, or may be migrated or archived in a slower tier, such as a tape in tape storage. Thus, when a file is moved from higher tier to a lower tier, or vice versa, the HSM file system changes data pointer 234 and file attributes 233 to indicate the migration status.

In an HSM file system, data belonging to files that are rarely accessed may be migrated from expensive on-line disk storage to less expensive near-tine or off-line tape storage. The file attributes, including the name (directory entry), size, access control, etc. remain on-line at all times; only the data or a portion of the data, are moved off-line. Thus, in the example shown in FIG. 2, the directory tree 210 and inode file 220 would remain on-line, while data block 250 may be in off-line storage.

To protect data against loss, a backup copy of all file data is required. If file data has been migrated offline, it is expensive to recall such data for backup purposes. Thus alternate techniques are required for HSM managed file systems. One technique for backing up and restoring an HSM file system is to pre-migrate online data into the less expensive second storage tier and then perform a metadata image backup, which permits a rapid restoration of very large file systems. A metadata image backup captures the on-line file metadata (i.e., directory tree and inode file), including references to the off-line file data managed by the HSM file system. The corresponding "metadata image restore" rapidly restores the file metadata, leaving all the file data off-line in the second tier of the HSM file system. All online files in the HSM managed file system must be pre-migrated for the very rapid "metadata image restore" to permit recalling the file data when needed. The pre-migration step must complete prior to performing the metadata image backup.

In an archival storage appliance, such as the IBM Information Archive, the file system is an HSM managed file system with two tiers. In use, the end user writes files to the appliance. When writing completes, the user has the option to "commit" the data, which insures the data is stored reliably and is marked as immutable, thereby preventing further changes to the file data itself. The appliance later processes the "committed" files by pre-migrating or migrating them to the second storage tier, A typical data backup performed on such an appliance for disaster recovery, for example, creates a point-in-time image of the file system and must include all files in which the user has committed the data.

The system preserves the file contents by marking the file as "immutable" by setting a bit within the inode, such as in attributes 233. Once this bit is set, the file data can no longer be modified or deleted. The metadata image backup approach. requires every file that must be protected to be managed by an HSM or data management application programming interface (DMAPI) application and pre-migrated or hilly migrated; otherwise, the file data may not be retrievable via, the metadata image restore method. In large, busy file systems, some files known as resident files are not yet pre-migrated or migrated and must be backed up via an alternate means to avoid data loss. Thus, in such a system, there may be files that are marked as immutable and yet still resident in the first storage tier. These files have not yet have become migrated by the HSM/DMAPI. For those files, only the inode and metadata would be backed up and restored via metadata image backup and metadata image restore, leaving the file data unprotected. Thus, such files must be protected via other mechanism.

In accordance with illustrative embodiments, a mechanism is provided for utilizing a hybrid of metadata image backup and traditional backup for partially ingested files. The mechanism efficiently backs up the complete collection of files in a large and busy file system to guard against data loss. The mechanism uses a change audit log to determine a list of resident files and that were added or changed since last back up and takes special measures for those files that did not qualify for simple metadata image backup due to their resident state. Additionally, the mechanism allows data for immutable files to be restored via a traditional backup/archive restore process.

The mechanism of the illustrative embodiments detects immutable, resident files during metadata image restore and resets their immutable bit in attributes 233 to allow restore of that file's data blocks, The detection mechanism involves communicating with the HSM/DMAPI application to determine whether the data is truly managed by the HSM application. If the data is not managed by the HSM application, the mechanism resets the immutable bit to allow restore of the file's data blocks. Care must be taken to handle 0-byte file sizes as those may not be handled by HSM and the metadata image restore alone represents a valid and complete restore of such files.

An external data protection mechanism for immutable resident files is responsible for restoring data along with setting the immutable bit as part of the file attributes, The external data protection mechanism must be aware of the immutability aspect to avoid restoring the immutable bit before the data. This is also a key element in ensuring that restore process preserves the immutability of data to ensure adherence to the compliance rules of the archival appliance.

Figure 3:
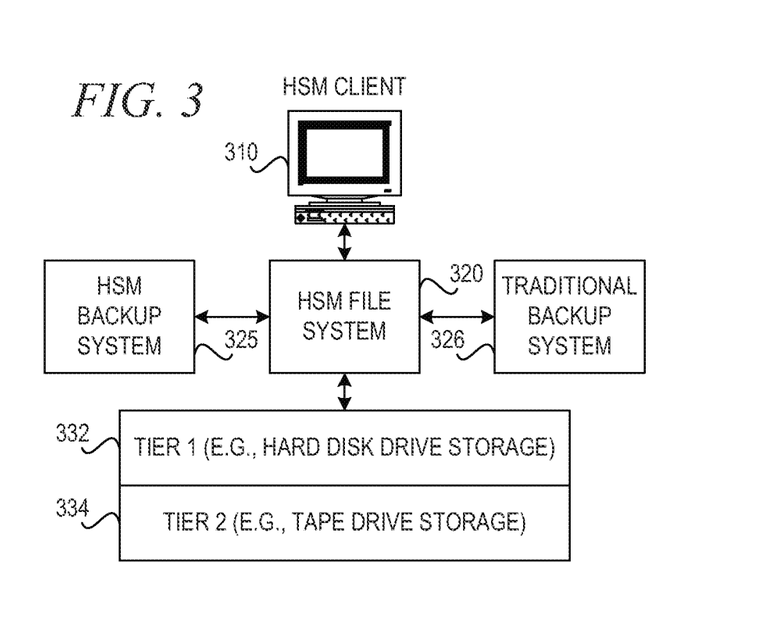
FIG. 3 is a block diagram illustrating a hybrid metadata image backup/restore and traditional backup/archive system in accordance with an illustrative embodiment.

FIG. 3 is a block diagram illustrating a hybrid metadata image backup/restore and traditional backup/archive system in accordance with an illustrative embodiment. Hierarchical storage management (HSM) client 310 connects to HSM managed file system 320 via a direct connection, a network, a storage area network (SAN) or fabric, or the like, HSM client 310 accesses files in HSM managed file system 320 by creating, reading, modifying, writing, and deleting files.

HSM managed file system 320 stores the most recently and/or most frequently accessed files in tier 1 332, which is typically the more expensive but fastest storage. Tier 1 332 may be, for example, hard disk drive storage, as these devices provide fast access to the file data. HSM managed file system 320 stores file metadata, such as the directory tree and inode file, in memory (not shown) and/or in tier 1 332.

HSM managed file system moves data. belonging to files that are rarely accessed from tier 1 332 to tier 2 334, which is typically the less expensive but slower storage. Tier 2 334 may be, for example, tape storage. In general, file data in tier 1 332 are referred to as "resident" or "on-line," while file data in tier 2 334 are referred to as "off-line."

While the example depicted in FIG. 3 shows two tiers, a hierarchical storage management file system may have more tiers. For example, tier 1 332 may be memory-based or solid state drives. A solid-state drive (SSD), sometimes called solid-state disk or electronic disk, is a data storage device that uses solid-state memory to store persistent data with the intention of providing access in the same manner of a traditional block I/O hard disk drive. SSDs are distinguished from traditional magnetic disks such as hard disk drives (HDDs) or floppy disk, which are electromechanical devices containing spinning disks and movable read/write heads. In contrast, SSDs use microchips that retain data in non-volatile memory circuits and contain no moving parts. Compared to electromechanical HDDs, SSDs are typically less susceptible to physical shock, are silent, have lower access time and latency, but are more expensive per gigabyte (GB). SSDs use the same interface as hard disk drives, thus easily replacing them in most applications. Tier 2 334 may be hard drive storage, and a third tier may be tape drive storage. Generally, the highest tier with the fastest storage devices acts as a cache for the lower tiers, All file data residing in the highest tier are considered to be "on-line," while all file data residing in the lower tiers are considered to be "near-line" or "off-line,"

Tier 2 334 may comprise "disk pool" for the HSM data, which is referred to as "near-line" storage, as it is not in the file system "on-line" but is also not yet pushed all the way to tape storage. Data typically ages in disk pool before being committed to tape storage.

The illustrative embodiments define the backup metadata image as containing the file system's directory structure (or name space) and its metadata for the files in the file system, such as owner, access time, file size, etc. Each file also includes its permissions, often referred to as its access control list (ACL), and the extended attributes necessary to locate the file data. in the off-line backup. This is the minimum amount of data that must be restored to recover an HSM managed file system.

In accordance with the illustrative embodiment, HSM client 310 creates a snapshot of the HSM managed file system 320, and subsequently performs a metadata image backup via HSM backup system 325, backing up the above-described metadata (e.g., directory structure and file attributes). Concurrently with the metadata image backup, HSM client 310 starts a process to identify resident files whose data are not yet copied offline and therefore not protected in the metadata. image backup. HSM client 310 passes this list to a traditional backup system 326, which backs up the identified resident files using a traditional backup/archive technique.

To restore the HSM managed file system 320, for example, after a catastrophic failure, HSM client 310 performs a metadata image restore via HSM backup system 325, restoring the file system image (e.g., directory structure and file attributes), The metadata image restore process detects when it is not able to restore a file to the proper DMAPI migrated state. For example, restoring a file may fail when its extended attributes do not contain a unique identifier pointing to off-line storage. When such a failure is detected, the file must have been resident and possibly also immutable at the time of the metadata image backup. The restore process for such resident files must change the immutable bit in the file's attributes, making the file data writable, to allow the file data to be restored. Traditional backup system 326 restores those files that were identified as resident.

In one example embodiment, the backup/restore mechanism allows restore of immutable files by an external data protection solution by providing application programming interface (API), which will not restore the state of the immutable bit when the restore process restores the rest of the attributes until the file is closed by the restore process. The immutable bit would be reset implicitly in the event of a process or system crash.

As will be appreciated by one skilled in the art, the present invention may be embodied as a system, method, or computer program product. Accordingly, aspects of the present invention may take the form of an entirety hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in any one or more computer readable medium(s) having computer usable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in a baseband or as part of a carrier wave. Such a propagated signal may take any of a variety of forms, including, but not limited to, etectro-magnetic, optical, or any suitable combination thereof. A computer readable signal medium may be any computer readable medium that is nota computer readable storage medium and that can communicate, propagate, or transport a program for use by or in connection with an instruction execution system, apparatus, or device.

Computer code embodied on a computer readable medium may be transmitted using any appropriate medium, including but not limited to wireless, wireline, optical fiber cable, radio frequency (RF), etc., or any suitable combination thereof.

Computer program code for carrying out operations for aspects of the present invention may be written in any combination of one or more programming languages, including an object oriented programming language such as Java™, Smalltalk™, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer. or server. In the tatter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

Figure 4:
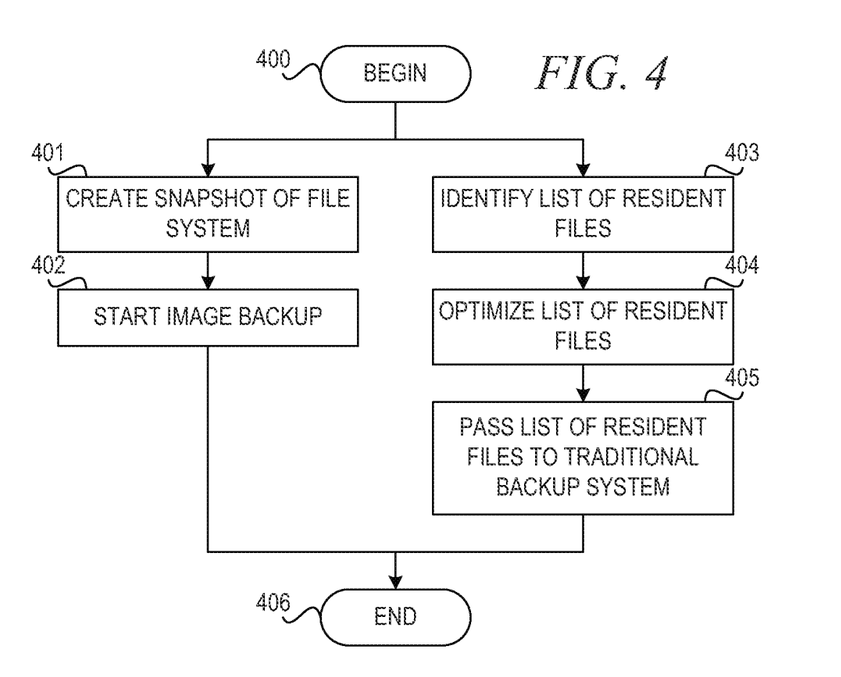
FIG. 4 is a flowchart illustrating operation of a hybrid metadata image backup and traditional backup/archive system in accordance with an illustrative embodiment.

FIG. 4 is a flowchart illustrating operation of a hybrid metadata image backup and traditional backup/archive system in accordance with an illustrative embodiment. Operation begins in block 400, and the system creates a snapshot of the file system to ensure a consistent point-in-time. image of the file system (block 401) from which to back up. The system starts file system metadata image backup (block 402) to capture directory, inode, metadata (ACLs and extended attributes). Note that the system does not capture data blocks, because those are already assumed to be in the HSM pool (off-line storage).

Concurrently with the metadata image backup in blocks 401 and 402, the system identifies a list of resident files (block 403), These files do not have the data copied in off-line storage. Additionally, some of the resident files may have the immutable bit set, while others may not. This list may be obtained by scanning the inodes of the file system in an efficient manner or via an audit system that tracks file update activities. The system optimizes the list to only backup data that has been fully transferred into the archive system and completed (block 404). For example, if a file is in flight when the snapshot is taken in block 401, the system will not back it up. It may also be desirable to only backup resident files that have the immutable bit set. In one example embodiment, the system may optimize the list of resident files with specification of policy attributes to support file selection. The system passes the optimized list of resident files to a traditional backup system to ensure complete protection of the entire file system and its data (block 405).

Thereafter, when the entire metadata image backup and resident file backup are complete, operation ends in block 406.

Figure 5:
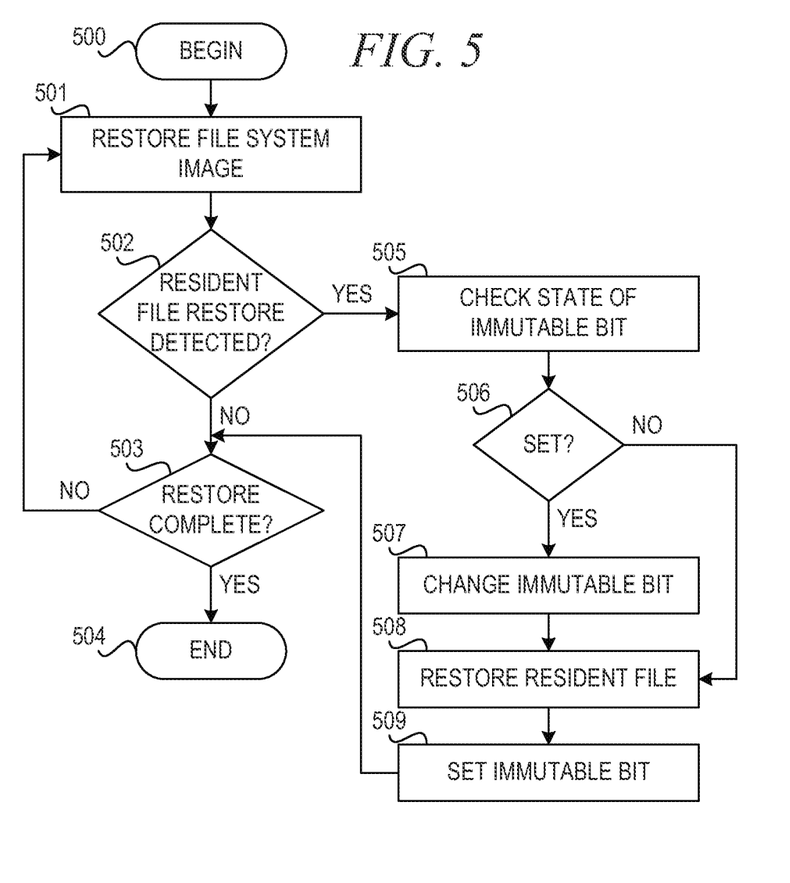
FIG. 5 is a flowchart illustrating operation of a hybrid metadata image restore and traditional restore system in accordance with an illustrative embodiment.

FIG. 5 is a flowchart illustrating operation of a hybrid metadata image restore and traditional restore system in accordance with an illustrative embodiment. Operation begins in block 500, and the system restores the file system metadata image (block 501). This metadata image restore procedure restores file metadata for DMAPI-managed files as well as resident files.

In order to allow restore of resident files, the system must detect when it is not able to restore such a file in a migrated DMAPI-managed state. The system detects whether such a file has been restored to the resident state in block 502. The system will detect this case when the file's metadata does not contain a unique identifier pointing to its off-line storage. If that is not detected, the system next determines whether the restore is complete (block 503). If restore is complete, operation ends in block 504. If restore is not complete, operation returns to block 501 to continue to restore the file system metadata image.

If the system detects a resident file has been restored in block 502, the system checks the state of the immutable bit (block 505) and determines whether the immutable bit is set (block 506). If the immutable bit is set, the system changes the immutable bit (block 507). Thereafter, or if the immutable bit is not set in block 506, the system restores the resident file using a traditional backup/restore system (block 508). Then, if the previous state of the immutable bit was set, the system sets the immutable bit (block 509). Operation continues to block 503 to determine whether the restore is now complete. The metadata image restore and immutable file data restore can run concurrently with data restoration being started when such a file is detected in the metadata image restore stream.

The flowchart and block diagrams in the figures illustrate the architecture, functionality, and operation of possible implementations of systems, methods and computer program products according to various embodiments of the present invention. this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Thus, the illustrative embodiments provide mechanisms for utilizing a hybrid of metadata image backup and traditional backup for partially ingested files. The mechanism may efficiently back up the complete collection of files in a large and busy file system to guard against data loss, particularly for resident and immutable files.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer program product comprising a computer readable storage medium having a computer readable program stored therein, wherein the computer readable program, when executed on a computing device, causes the computing device to:

perform pre-migration to migrate committed resident files to off-line storage in a hierarchical storage management (HSM) file system;

responsive to initiating a hybrid metadata image backup and backup operation, perform a metadata image backup of the HSM file system, wherein the metadata image backup backs up file system metadata to create a point-in-time image of the HSM file system;

concurrent with performing the metadata image backup of the HSM file system, identify a set of resident tiles that are not yet migrated to off-line storage in the HSM file system;

identify immutable files within the set of resident files to form an optimized set of resident files; and pass the optimized set of resident files to a backup system, wherein the backup system backs up file data for the optimized set of resident files.

2. The computer program product of claim 1, wherein the file system metadata comprises a directory tree and an inode file.

3. The computer program product of claim 2, wherein the inode file comprises a plurality of inode entries, wherein each inode entry comprises a data pointer referencing on-line storage or off-line storage.

4. The computer program product of claim 3, wherein identifying the set of resident files comprises identifying inodes with data pointers referencing on-line storage.

5. The computer program product of claim 3, wherein each inode entry comprises a set of attributes and wherein identifying immutable files within the set of resident files comprises identifying inode entries having an immutable bit set in the attributes.

6. The computer program product of claim 3, wherein identifying immutable files within the set of resident files comprises performing a scan of inodes of the file system to detect immutable objects.

7. The computer program product of claim 3, wherein identifying the set of resident files comprises performing a scan of inodes of the file system to detect resident files.

8. The computer program product of claim 1, wherein the computer readable program further causes the computing device to:
perform a metadata image restore of the HSM file system, wherein the metadata image restore restores the point-in-time image of the HSM file system; and
responsive to detecting an inability to restore a migrated managed state of file, unset an immutable bit of the file, restore file data for the file using the backup system, and set the immutable bit of the file.

9. The computer program product of claim 8, wherein restoring file data for the file using the backup system is performed concurrently with performing recall of migrated files.

10. The computer program product of claim 1, wherein the computer readable program further causes the computing device to;
perform a metadata image restore of the HSM file system, wherein the metadata image restore restores the point-in-time image of the HSM file system and preserves immutability for all files in the HSM file system.

11. The computer program product of claim 1, wherein identifying the set of resident files comprises identifying the set of resident files via an audit system that tracks file update activities.

12. The computer program product of claim 1, wherein the computer readable program is stored in a computer readable storage medium in a data processing system and wherein the computer readable program was downloaded over a network from a remote data processing system.

13. The computer program product of claim 1, wherein the computer readable program is stored in a computer readable storage medium in a server data processing system and wherein the computer readable program is downloaded over a network to a remote data processing system for use in a computer readable storage medium with the remote system.

14. A method, in a data processing system, for hybrid metadata image backup and backup, the method comprising:
performing pre-migration to migrate committed resident files to off line storage in a hierarchical storage management HSM files system;
responsive to initiating a hybrid metadata image backup and backup operation, performing a metadata image backup of the HSM file system, wherein the metadata image backup backs up file system metadata to create a point-in-time image of the HSM file system;
concurrent with performing the metadata image backup of the HSM file system, identifying a set of resident files that are not yet migrated to off-line storage in the HSM file system;
identifying immutable files within the set of resident files to form an optimized set of resident files; and
passing the optimized set of resident files to a backup system, wherein the backup system backs up file data for the optimized set of resident files.

15. The method of claim 14, wherein the file system metadata comprises a directory tree and an inode file.

16. The method of claim 15, wherein the inode file comprises a plurality of inode entries, wherein each inode entry comprises a data pointer referencing on-line storage or off-line storage.

17. The method of claim 16, wherein each mode entry comprises a set of attributes and wherein identifying immutable files within the set of resident file comprises identifying Mode entries having an immutable bit set in the attributes.

18. The method of claim 14, further comprising:
performing a metadata image restore of the HSM file system, wherein the metadata image restore restores the point-in-time image of the HSM file system; and
responsive to detecting an inability to restore a managed state of a file, unsetting an immutable bit of the file, restoring file data for the file using the backup system, and setting the immutable bit of the file.

19. An apparatus, comprising:
a processor; and
a memory coupled to the processor, wherein the memory comprises instructions which, when executed by the processor, cause the processor to:
perform pre-migration to migrate committed resident files to off-line storage in a hierarchical storage management (HSM) file system;
responsive to initiating a hybrid metadata image backup and backup operation, perform a metadata image backup of the HSM file system, wherein the metadata image backup backs up file system metadata to create a point-in-time image of the HSM file system;
concurrent with performing the metadata image backup of the HSM file system, identify a set of resident files that are not yet migrated to off-line storage in the HSM file system;
identify immutable files within the set of resident files to form an optimized set of resident files; and
pass the optimized set of resident files to a backup system, wherein the backup system backs up file data for the optimized set of resident files.

20. The apparatus of claim 19, wherein the instructions further causes the processor to:
perform a metadata image restore of the HSM file system, wherein the metadata image restore restores the point-in-time image of the HSM file system; and
responsive to detecting an inability to restore a managed state of a file, unset an immutable bit of the file, restore file data for the file using the backup system, and set the immutable bit of the file.

* * * * *